United States Patent Office 3,618,366
Patented Nov. 9, 1971

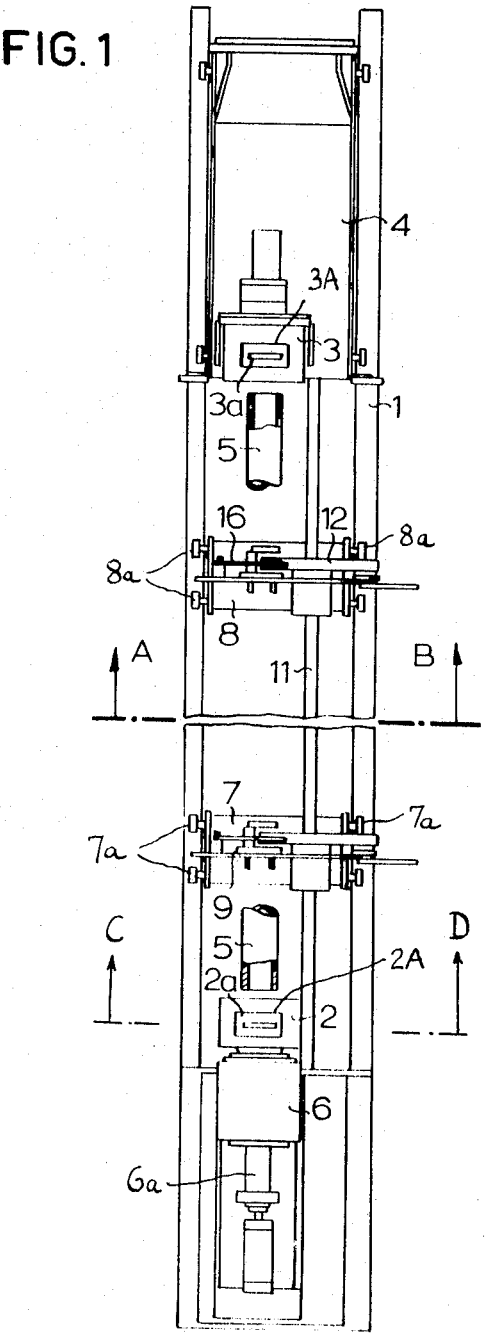

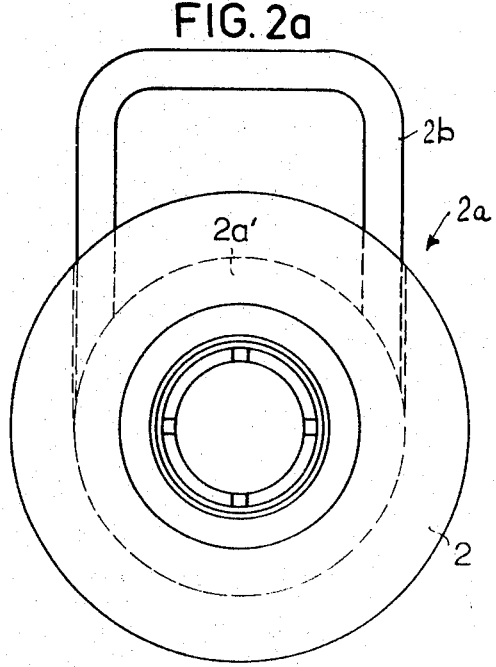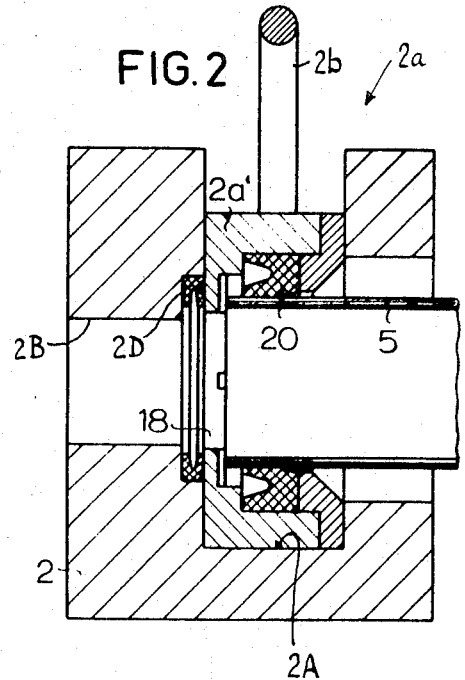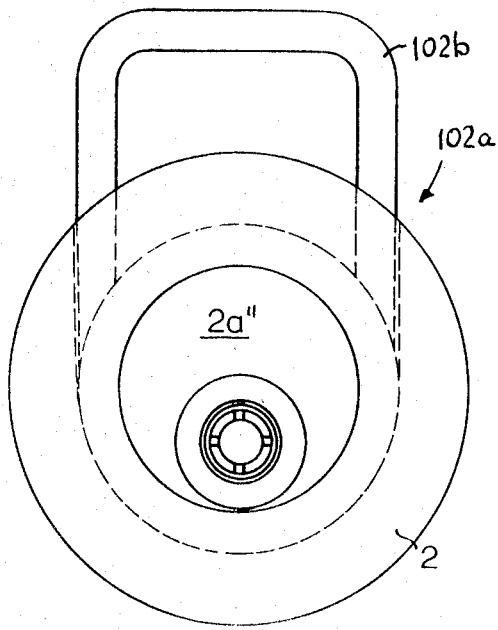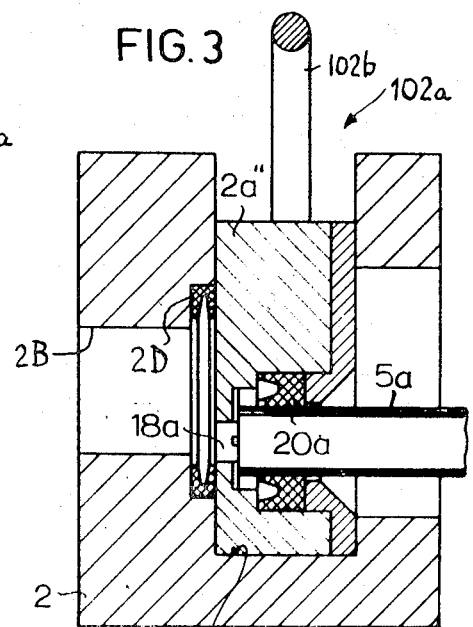

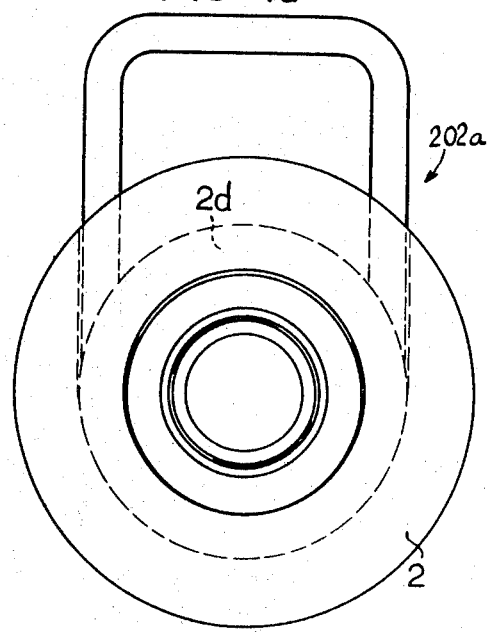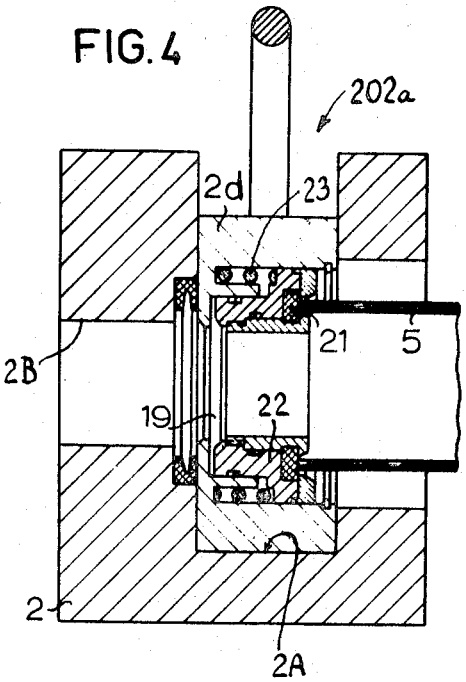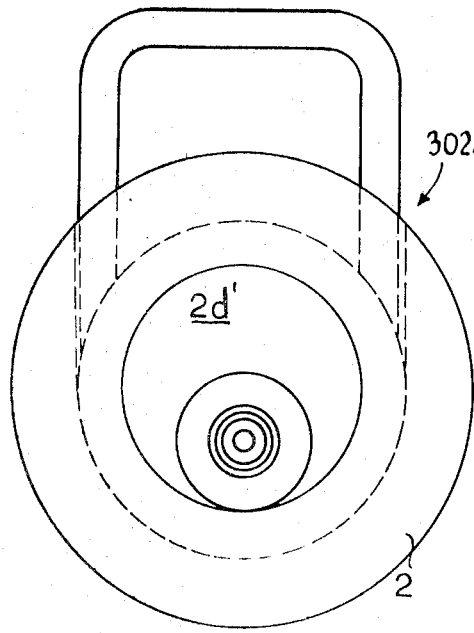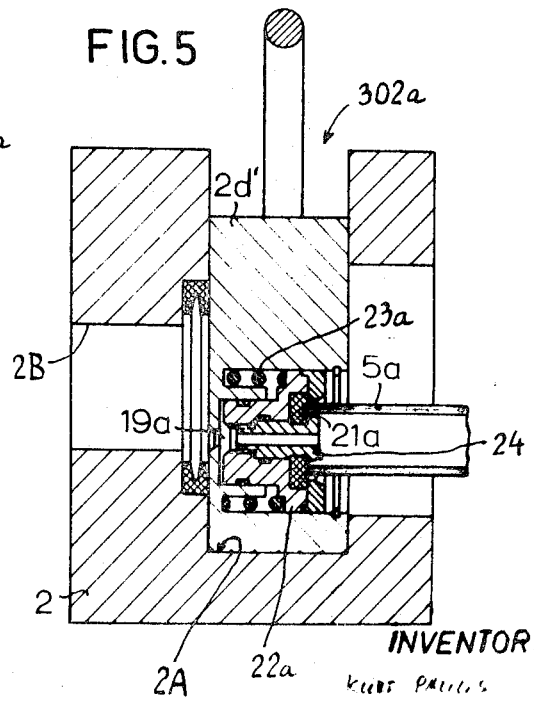

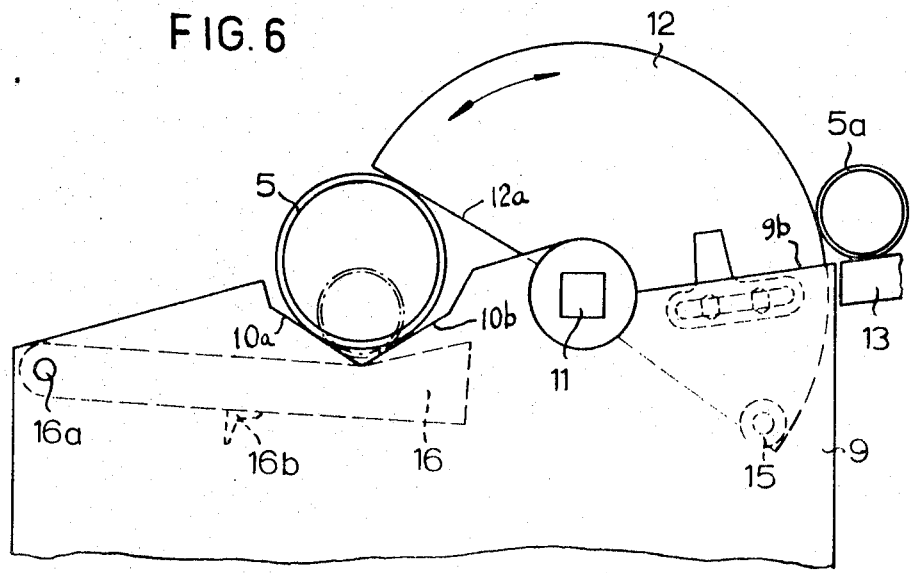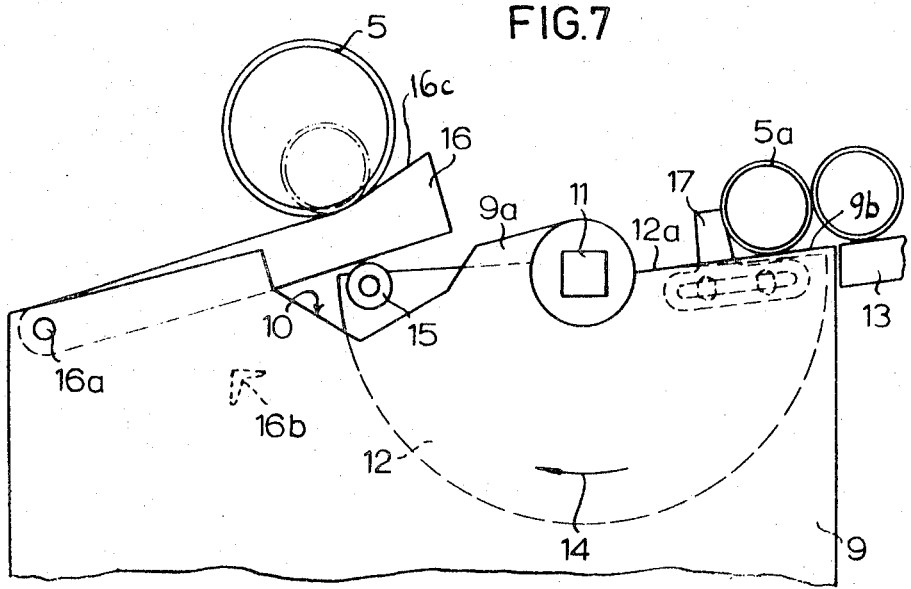

3,618,366
APPARATUS FOR TESTING OF PIPES OR THE LIKE
Kurt Pauls, Langenfeld, and Hans Brauer, Leichlingen, Germany, assignors to Th. Kieserling & Albrecht, Solingen, Germany
Filed Jan. 15, 1970, Ser. No. 3,034
Int. Cl. G01n 3/12
U.S. Cl. 73—49.5                        8 Claims

ABSTRACT OF THE DISCLOSURE

A testing apparatus for pipes wherein the testing heads which engage the end portions of a pipe during testing with a fluid are insertable into the chambers of aligned stationary or indexible supports and are provided with sealing rings which engage the circumferences or the end faces of pipes during testing. The positions of sealing rings and fluid conveying passages in the testing heads are selected in such a way that the parts which support and clamp intermediate portions of pipes during testing require minor adjustments when a larger-diameter pipe is tested after a smaller-diameter pipe or vice versa.

BACKGROUND OF THE INVENTION

The present invention relates to improvements in apparatus for testing of pipes, tubes or analogous elongated tubular workpieces or articles by means of a hydraulic or pneumatic fluid. More particularly, the invention relates to improvements in the construction and mounting of testing heads which are utilized in such apparatus to convey testing fluid to and from as well as to seal the end portions of tubular workpieces during testing. Still more particularly, the invention relates to improvements in convertible testing apparatus which can be utilized for testing of tubular workpieces of different diameters.

Presently known convertible testing apparatus are complicated and expensive, mainly because the conversion from testing of larger pipes to testing of smaller pipes or vice versa necessitates a large number of adjustments. It is necessary to adjust and/or remove the testing heads, i.e., those parts which are placed into sealing engagement with the end portions of pipes, as well as to adjust and/or replace the mechanism which feeds, grips and removes pipes from the testing station. Such adjustments are particularly difficult and time-consuming in multiple testing apparatus wherein the supports for the testing heads are indexible or otherwise movable.

It is already known to mount several testing heads on a carrier which is connectable to a support in several positions so that a selected testing head assumes a requisite position for engagement with the tested workpieces. As a rule, the carrier is provided with flanges each of which can be coupled to a complementary flange on the respective support. It is also known to provide each testing head with a bayonet connection which can be coupled to and detached from the support. This is intended to shorten the time which is required for conversion of a testing apparatus. A drawback of just described proposals is that the apparatus must comprise a substantial number of precision-finished auxiliary parts.

It is further known to provide testing apparatus for pipes or the like with a transporting mechanism which is adjustable so that it can support a larger-diameter pipe or a smaller-diameter pipe in requisite position for engagement with interchangeable testing heads. Adjustment is necessary because the supports for the testing heads are designed in such a way that the axis of the sealing element in a smaller testing head is positioned in the same way as the axis of a larger testing head which takes the place of the smaller head, or vice versa. As a rule, the transporting mechanism comprises a set of disks which carry adjustable tongs or like gripping devices capable of holding pipes of smaller or larger diameter. If the transporting mechanism is to support two or more pipes at a time, it must be provided with auxiliary devices which can simultaneously adjust all of the tongs to insure that the intervals between successive testing operations are reduced to a minimum. All this contributes to the complicatedness, bulk and cost of such apparatus. The same applies for apparatus wherein two sets of testing heads are adjustable in a simultaneous operation.

SUMMARY OF THE INVENTION

An object of the invention is to provide a novel and improved testing apparatus for pipes, tubes or analogous tubular workpieces which can test workpieces of different internal or external diameters and which can be conveniently and rapidly converted for testing of different sizes of workpieces.

Another object of the invention is to provide novel and improved testing heads and supports for such testing heads for use in the improved testing apparatus.

A further object of the invention is to provide a testing apparatus wherein a single mechanism can properly feed, support, grip, release and eject workpieces of different diameters and wherein such mechanism necessitates only minor adjustments or no adjustment at all when a freshly tested workpiece is to be followed by a workpiece of greater or smaller diameter.

An additional object of the invention is to provide novel and improved testing heads which can be used with equal advantage in stationary as well as in indexible supports.

The improved apparatus comprises a first support, a second support which is aligned with and spaced from the first support, a chamber in each support, and a pair of testing heads each removably accommodated in one of the chambers. Each testing head may constitute or resemble a cassette which can be slipped into or removed from the respective chamber, and each such testing head accommodates an annular sealing element which can engage the external surface or the end face at the respective end of a pipe which is placed between the supports and is supported and gripped during testing by means of a fluid. The fluid is admitted through an axial or eccentric bore in one of the testing heads and is evacuated through the bore of the other testing head.

The novel features which are considered as characteristic of the invention are set forth in particular in the appended claims. The improved testing apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a diagrammatic plan view of a stationary testing apparatus which embodies one form of the invention and which is set up for testing of large-diameter pipes;

FIG. 2 is an enlarged fragmentary sectional view as seen in the direction of arrows from the line C-D of FIG. 1 and illustrates the construction of one of the testing heads;

FIG. 2a is an end elevational view of the testing head as seen from the right-hand side of FIG. 2;

FIG. 3 is a longitudinal vertical sectional view of a support and of a modified testing head which can be used in connection with testing of small-diameter pipes;

FIG. 3a is an end elevational view of the second testing head as seen from the right-hand side of FIG. 3;

FIG. 4 is a sectional view similar to that of FIG. 2 but showing a third testing head which can replace the testing heads shown in FIG. 1;

FIG. 4a is an end elevational view of the third testing head as seen from the right-hand side of FIG. 4;

FIG. 5 is a sectional view similar to that of FIG. 3 but showing a fourth testing head which can replace the testing head of FIGS. 3 and 3a;

FIG. 5a is an end elevational view of the fourth testing head as seen from the right-hand side of FIG. 5;

FIG. 6 is an enlarged fragmentary transverse vertical sectional view as seen in the direction of arrows from the line A-B of FIG. 1; and FIG. 7 illustrates the structure of FIG. 6 but showing a transfer member for pipes in a different angular position.

DESCRIPTION OF THE PREFERRED EMBODIMENTS

Referring first to FIGS. 1, 6 and 7, there is shown an apparatus which can be used for testing of metallic pipes 5 or 5a or analogous elongated tubular workpieces. The apparatus comprises a frame including an elongated base 1 for two spaced supports 2, 3 which are provided with sockets or chambers 2A, 3A for cassette-like testing heads 2a, 3a, respectively. These testing heads will be described later in connection with FIGS. 2 to 5.

The support 2 is mounted on the piston rod 6a of a double-acting hydraulic cylinder 6 which is installed at one end of the base 1. The cylinder 6 can move the support 2 toward or away from the support 3 but normally holds the support 3 in a fixed position. The other support 3 is mounted on a carriage 4 which is reciprocable toward and away from the support 2 in ways provided therefor at the other longitudinal end of the base 1.

The base 1 further carries at least one but preferably two or more locating and conveying devices which are disposed between the supports 2, 3 and serve to maintain pipes 5 and 5a at a predetermined level and in predetermined positions during testing by means of a fluid which is admitted by way of the testing head 2a and is evacuated by way of the testing head 3a, or vice versa. The drive for moving the carriage 4 lengthwise of the base 1 may comprise a feed screw, a rack and pinion drive or any other suitable displacing means, not shown. As a rule, the cylinder 6 is actuated to displace the support 2 only when the length of a pipe to be tested exceeds or is less than the length of the previously tested pipe or pipes. The carriage 4 can displace the support 3 to permit placing of successive pipes between the testing heads 2a, 3a, to permit rapid removal of tested pipes, as well as to compensate for eventual differences between the length of pipes of a given series.

The aforementioned locating and conveying means of the illustrated apparatus comprises two carriages 7, 8 which are mounted on wheels or rolls 7a, 8a arranged to travel along the base 1 between the supports 2, 3 so as to place the two carriages into an optimum position for proper manipulation and retention of pipes prior to, during and after testing. The number of such carriages depends on the length and/or weight of pipes which are to be tested. Each of the carriages 7, 8 includes an upright holder 9 (best shown in FIGS. 6 and 7) having in its top face a substantially V-shaped recess or notch 10 for reception of pipes. A longitudinally extending shaft 11 whose ends are preferably mounted directly on the base 1 can rotate two substantially semicircular transfer members 12 each of which is movable legnthwise of the shaft 11 with one of the holders 9. The shaft 11 is connected with a motor or the like, not shown, which can move each transfer member 12 between the end positions shown in FIGS. 6 and 7. The purpose of the members 12 is to transfer successive pipes 5 or 5a from a grate 13 into the aligned notches 10 of the holders 9 and to thereupon expel freshly tested pipes 5 or 5a so that they are caused to enter a conveyor (not shown) which moves them to a further station or to storage. Still further, the transfer members 12 serve to clamp or grip the pipes 5 or 5a during testing.

FIG. 6 illustrates a large-diameter pipe 5 in the notch 10. The transfer member 12 presses the pipe against the surfaces 10a, 10b flanking the notch 10 so that the pipe is held in a requisite position for engagement of its end portions with the sealing elements in the corresponding testing heads. When the testing operation is completed, the transfer member 12 is rotated in a clockwise direction (arrow 14) toward the position shown in FIG. 7. A roller 15 on the member 12 then engages and pivots an ejector lever 16 which is mounted on a pin 16a of the holder 9 and causes the lever to lift the freshly tested pipe 5 from the notch 10. The pipe then rolls along the inclined surface 16c of the lever 16 and enters a conveyor which moves it away from the testing apparatus. At the same time, a fresh pipe (e.g., a smaller diameter pipe 5a) rolls off the grate 13 and against a stop 17 which is adjustably mounted on the holder 9. The stop 17 can be positioned in such a way that it allows only one pipe 5 or 5a to roll off the grate 13 and onto the adjacent top face 9b of the holder 9. Thus, before the larger-diameter pipe 5 is expelled from the notch 10, the stop 17 should be adjusted to assume the position shown in FIG. 7 in which it allows a single smaller-diameter pipe 5a to roll off the grate 13 onto the top face 9b. The face 9b is then at least substantially aligned with the radially extending surface 12a of the transfer member 12. When the member 12 is thereupon rotated in a counterclockwise direction, as viewed in FIG. 7 (toward the position shown in FIG. 6), the surface 12a lifts the foremost pipe 5a off the top face 9b and causes it to roll along the top face 9a and into the notch 10. At the same time, the ejector lever 16 descends by gravity and comes to rest on a bracket 16b of the holder 9. The transfer member 12 continues to turn in a counterclockwise direction until its surface 12a clamps the pipe 5a against the surfaces 10a, 10b in the notch 10. The pipe 5a is then held in an optimum position for engagement of its end portions with the corresponding testing heads.

The apparatus may be provided with a programming system which effects movements of piston rod 6a and carriage 4 as well as rotation of the shaft 11 in a predetermined sequence so that an entire series of pipes 5 or 5a can be tested automatically at a desired speed.

Referring now to FIGS. 2 and 2a, there is shown a testing head 2a which can be used for testing of larger-diameter pipes 5. This testing head is a cassette which can be introduced into the socket or chamber 2A of the support 2. To this end, the chamber 2A is open from above and the cylindrical portion 2a' of the head 2a is provided with a U-shaped handle 2b which facilitates insertion or withdrawal of the head from the support 2. The testing head 3a is preferably of identical design, i.e., the two heads can be used interchangeably. The cylindrical portion 2a' accommodates an annular sealing element 20 which surrounds one end portion of the pipe 5 when the latter is properly introduced into the support 2. The cylindrical portion 2a' is further provided with an axial passage or bore 18 which communicates with the interior of the pipe 5 and with a bore 2B in the support 2 when the testing head 2a is properly inserted into the chamber 2A. The bore 18 is coaxial with the cylindrical portion 2a' and with the bore in the cylindrical portion of the testing head 3a.

When the operator wishes to test a pipe 5a, the testing heads 2a, 3a are replaced with testing heads 102a one of which is shown in FIGS. 3 and 3a. This testing head comprises a cylindrical portion 2a" having a handle 102b and accommodating a smaller-diameter sealing element 20a which can sealingly engage the circumference of one end portion of a pipe 5a. The interior of such end portion then communicates with an eccentric bore or passage 18a in the cylindrical portion 2a". The bore 18a communicates with the bore 2B of the support 2. The unit which admits testing fluid to the bore 2B of one of the supports 2, 3 and which receives testing fluid from the bore of the other support is known in the art and its construction and operation form no part of the present invention. Such unit is preferably designed to produce signals which are indicative of defective pipes. FIGS. 2 and 3 further show a gasket 2D which is inserted into the support 2 at the inner end of the bore 2B to prevent leakage of testing fluid toward the open upper end of the chamber 2A.

FIGS. 4 and 4a illustrate a testing head 202a which can be used as a substitute for the testing head 2a or 3a. This testing head is also removably receivable in the chamber 2A (or in the chamber 3A) and comprises an annular sealing element 21 which can engage the end face of the end portion of a pipe 5. The cylindrical portion 2d of the testing head 202a defines a cylinder chamber 19 for a plunger 22 which is biased by a spring 23 and urges the sealing element 21 against the adjacent end face of the pipe 5. The cylinder chamber 19 constitutes a bore or passage which admits or evacuates testing fluid, depending upon whether such fluid is admitted to the support 2 or 3. One end of the chamber 19 communicates with the bore 2B in the support 2. It will be noted that the chamber 19 is coaxial with the cylindrical portion 2d.

The testing head 202a can be used interchangeably with the testing head 2a or 3a. As a rule, the testing head 202a is more likely to prevent leakage of testing fluid at elevated pressures. On the other hand, the testing head 2a of FIG. 2 comprises a smaller number of parts.

Referring finally to FIGS. 5 and 5a, there is shown a further testing head 302a which can be used as a substitute for the testing head 102a of FIGS. 3 and 3a. The testing head 302a comprises a cylindrical portion 2d' having an eccentric passage or bore 19a for a plunger 22a which is biased by a helical spring 23a and urges an annular sealing element 21a against the adjacent end face of a smaller-diameter pipe 5a. The passage 19a communicates with the bore 2B and with the axial passage of a nozzle 24 in the plunger 22a. It will be noted that the passage 19a is eccentric to the cylindrical portion 2d'.

An important advantage of the testing heads shown in FIGS. 1 to 5 is that they can be rapidly exchanged and that their sealing elements can engage the end portions of pipes 5 or 5a without necessitating any adjustment in the level of notches 10 in the holders 9. This is due to the fact that, when two identical testing heads 2a, 3a or 102a or 202a or 302a are properly accommodated in the chambers 2A, 3A, their sealing elements are automatically aligned with the ends of a pipe 5 or 5a in the notches 10. Thus, all that an operator has to do when he wishes to switch from testing of pipes 5 to testing of pipes 5a or vice versa (or to testing of pipes whose diameters deviate from those of the pipes 5 or 5a) is to introduce a corresponding testing head into each of the chambers 2A, 3A and to move the stops 17 on the holders 9 to such positions that only one pipe can roll onto the top faces 9b of the holders 9 when the corresponding transfer members 12 assume the positions shown in FIG. 7. This brings about considerable savings in time and allows for substantial simplification of the testing apparatus because the carriages 7, 8 can be used to transfer, locate and clamp pipes of various lengths and/or different diameters.

It is clear that the improved testing apparatus is susceptible of further modifications without departing from the spirit of our invention. For example, the carriages 7 and 8 may be replaced with other types of means for transporting workpieces toward and away from alignment with the testing heads. Also, the invention can be embodied in mobile testing apparatus as well as in continuously operating testing apparatus or in apparatus which carry out two or more testing operations (so-called multiple testing apparatus). Of course, if the supports 2 and 3 are not stationary, e.g., if they are to rotate about a horizontal axis, the chambers 2A, 3A must accommodate the testing heads in such a way that the latter cannot move during indexing of the supports. In testing apparatus which utilize indexible supports for the testing heads, the means for transferring workpieces preferably includes driven disks with gripping tongs for the workpieces. It was found that the provision of supports which can accommodate cassette-like testing heads brings about substantial simplification of all types of testing apparatus.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims.

We claim:

1. In an apparatus for testing of pipes or similar tubular workpieces, a combination comprising a first support; a second support aligned with and spaced from said first support, each of said supports having a chamber; a pair of first testing heads each removably accommodated in a respective one of said chamber; and at least one additional layer of testing heads insertable into said chambers upon withdrawal of said first pair of testing heads therefrom, said heads having aligned passages for testing fluid and tubular sealing elements each arranged to sealingly engage one end portion of a workpiece which is placed between said supports so that each such end portion communicates with one of said passages, said additional heads having passages and sealing elements whose diameters are different from the diameters of passages and sealing elements in said pair of first heads.

2. A combination as defined in claim 1, further comprising locating means for supporting tubular workpieces at a predetermined level while the end portions of such workpieces are engaged by sealing elements of testing heads in said chambers.

3. A combination as defined in claim 2, wherein the passages of testing heads in said chambers have a common substantially horizontal axis.

4. A combination as defined in claim 1, further comprising means for moving at least one of said supports toward and away from the other support.

5. A combination as defined in claim 1, wherein said sealing elements are arranged to surround the end portions of workpieces between said supports.

6. A combination as defined in claim 1, wherein said sealing elements are arranged to engage the end faces of end portions of workpieces between said supports.

7. A combination as defined in claim 1, wherein the outer dimensions of said first and of said additional testing heads are substantially identical.

8. In an apparatus for testing of pipes or similar tubular workpieces, a combination comprising a first support; a second support aligned with and spaced from said first support, each of said supports having a chamber; a pair of testing heads each removably accommodated in one of said chambers, said heads having aligned passages for testing fluid and tubular sealing elements each arranged to sealingly engage one end portion of a workpiece which is placed between said supports so that each end portion communicates with one of said passages; and a handgrip portion on each of said testing heads for facilitating its insertion into and withdrawal from the respective chamber.

References Cited

UNITED STATES PATENTS

| | | | |
|---|---|---|---|
| 3,118,546 | 1/1964 | McConnell et al. | 73—49.1 X |
| 3,179,127 | 4/1965 | Terry | 73—49.1 X |

LOUIS R. PRINCE, Primary Examiner

W. A. HENRY II, Assistant Examiner